Dec. 22, 1964   R. B. TACKABERRY   3,162,822
LASER PUMPING WITH PHOTOGRAPHIC FLASH BULB
Filed July 9, 1962
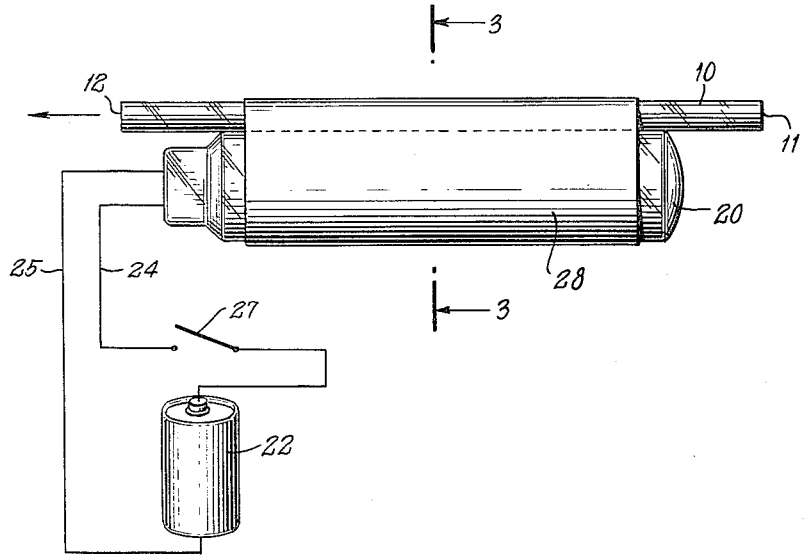
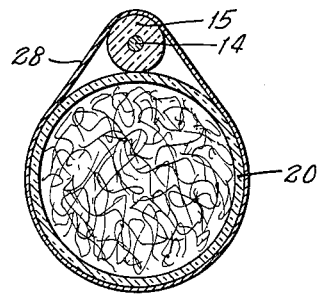
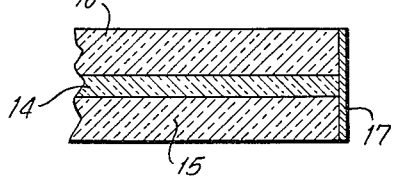
INVENTOR.
ROBERT B. TACKABERRY
BY
John A. Harvey
ATTORNEY United States Patent Office 3,162,822
Patented Dec. 22, 1964

3,162,822
LASER PUMPING WITH PHOTOGRAPHIC
FLASH BULB
Robert B. Tackaberry, Tonawanda, N.Y., assignor to
American Optical Company, Southbridge, Mass., a
voluntary association
Filed July 9, 1962, Ser. No. 208,469
6 Claims. (Cl. 331—94.5)

This invention relates to lasers, and particularly to so-called resonant laser structures including a body of solid laser material and an energy source for energizing such body to establish a laserable inversion of energy states thereof.

Lasers, sometimes referred to as optical masers, are light-amplifying devices and are specifically adapted to produce high intensity pulses of coherent monochromatic light concentrated in an extremely narrow beam. They find use in diverse fields as sources of such light energy, being employed for example in arts wherein it is desired to deliver light energy in intense and highly concentrated form to a relatively small target area.

Light is produced in a laser by photonic emission from the active atoms of a body composed of a so-called laser material. This emission occurs incident to the transition of the atoms from an excited, high energy level to a lower energy level. Accordingly, laser operation essentially involves the exciting of active atoms in the laser body to such high energy level, and the inducing of a coherent emissive transition of the excited atoms to the lower energy level to develop a monochromatic high-intensity laser output light pulse.

One form of laser structure includes a rod-shaped body of solid laser material disposed coaxially within or itself defining a so-called resonant cavity having opposed internally reflective cavity ends. To provide an energy source for exciting atoms to the aforementioned high energy level, this laser body is conventionally surrounded concentrically by a helical gaseous discharge tube adapted to emit a pulse of so-called "pumping" light specifically including light having wavelengths falling within at least one absorption band of the laser material. When the gaseous discharge tube is actuated, the resultant light pulse enters the laser body and photons of energy of appropriate absorptive wavelength are absorbed by active atoms in the body to cause these atoms to shift from an initial low energy level through a series of interlevel transitions to the high energy level referred to above and from which emissive transition occurs. Lasering action may take place when the population of atoms established at this higher energy level in the laser body by such light pumping exceeds the population of atoms remaining at the initial low energy level, a condition referred to as an inversion of energy states of the body.

When this inversion of energy states has been accomplished, individual atoms of the high-level population undergo emissive transition spontaneously, shifting to a terminal low energy level with concomitant emission of light. A portion of the spontaneously emitted light is reflected back and forth through the resonant cavity structure between its internally reflective cavity ends. As this light passes through the laser body in multiple bi-directional reflections, it induces other atoms of the enlarged high-level population to undergo light emissive transition to the terminal level. This produces more light, some of which augments the bidirectionally reflected light in the cavity to induce still further light emissive transitions from the high-level population. Thus a rising pulse of bidirectionally reflected light quickly develops in the cavity, reaching a quantitatively large value as the induced emissive transition of atoms from the high-level population becomes massive. If one of the reflective cavity ends is partially transmissive in character, a portion of this large bidirectionally reflected light pulse will pass through the one end and out of the cavity to constitute the laser output light pulse.

Such stimulated light emission can occur, however, only if the magnitude of the enlarged high-level population established by the pumping light pulse exceeds the magnitude of the population of atoms remaining at the initial low energy level by a value determined by energy-loss factors in the structure. Specifically, the threshold condition for laser action is that at which the ratio of wave energy storage to wave energy dissipation per wave energy cycle in the cavity becomes unity. To achieve an inversion of energy states in the laser body sufficient for this threshold condition, it has heretofore been necessary to provide a source of pumping light energy comprised by a gaseous discharge tube energized from a relatively large power source including a high-voltage source of electric current and capacitors having sufficiently large capacity to effect substantial energy storage. These complex large power sources are both bulky and expensive, and have constituted an important factor in the cost of a laser system. It would be very desirable, from the standpoints of laser system cost, compactness, portability and economy of laser operation to dispense with the need for such large input power sources.

Applicant has discovered that a high-intensity laser output light pulse useful for many laser applications can be produced, using a simple and inexpensive power source of small physical size, by the combination in a laser structure of certain particular laser materials and pumping light sources. Specifically, the present invention concerns the discovery that a neodymium-doped glass laser body of a type hereinafter described can be satisfactorily pumped, to produce a useful high-intensity laser output, with an inexpensive photographic flash bulb powered from a simple low-cost battery or like small power source. Laser structures embodying the present invention accordingly have the important advantages of ease and economy of operation by reason of their light weight, compact, readily portable, and low cost energizing power source.

Further objects and advantages of the invention will be apparent from the detailed description hereinbelow set forth, together with the accompanying drawings, wherein:

FIG. 1 is an illustration of a laser structure embodying the present invention in a particular form;

FIG. 2 is an enlarged fragmentary cross-sectional view of the laser element included in the structure of FIG. 1; and FIG. 3 is a cross-sectional view taken along the plane 3—3 of FIG. 1.

Referring to the drawing, the laser structure illustrated includes a cylindrical rod-shaped element 10, having opposed, plane, parallel end faces 11, 12. The element 10 has the construction shown more clearly by the enlarged cross-sectional view of FIG. 2 and includes an axially central core portion or fiber 14 fabricated of glass doped with neodymium and a glass cladding 15 concentrically surrounding the fiber 14 over its entire length. This laser element of which the fiber 14 forms the active laser component, in particular may be fabricated of materials and in the manner more fully disclosed in the copending application of Elias Snitzer, Serial No. 148,204, filed October 27, 1961 (now abandoned), and its continuation-in-part application, Serial No. 168,012, filed January 16, 1962, both entitled "Means for Producing and Amplifying Optical Energy," and both assigned to the same assignee as the present application. The element 10 may conveniently have a length of several inches with an external diameter typically of the order of 0.12 inch, the fiber 14 conventionally having a diameter of the order of 0.012 inch.

The end faces 11 and 12 of the element 10 have vacuum-evaporation deposited coatings of silver, such as the end coating 17 illustrated in FIG. 2, to constitute internally reflective termini of a conventional resonant laser cavity. However, if the laser element 10 has sufficient length a resonant cavity structure is created by having one end of the element reflectively coated as described above and by dispensing with a physical reflective coating on the other end of the element but utilizing an external propagation medium at the latter end (such as air) having a lower index of refraction than that of the fiber 14 so that this end reflects at least a small amount of wave energy, of the order of 5%. This type of cavity structure has been found to provide satisfactory lasering operation for many applications. When both ends of the element 10 are provided with reflective silver coatings as described above, the coating on the end face 12 for example is made partially transmissive and it is from this end face that the output laser light pulse emerges as indicated by the arrow in FIG. 1.

The structure further includes an elongate cylindrical flash bulb 20 disposed in contiguous, axially parallel relation to the element 10 intermediate its end faces, 11, 12 to provide a source of pumping light energy for the element. The bulb 20 is a zirconium wire-filled photographic flash bulb of the AG-1 type such as that marketed by the General Electric Company. This type of flash bulb has a color temperature generally of the value of approximately 4700° K. with a peak at about 4200° K. It is conveniently energized from one or more conventional 1.5 volt flash-light cells 22 through leads 24, 25. A manually operable switch 27 is connected in series with the cell 22 to control energization of the bulb 20 by the cell.

As shown in FIG. 1, and in cross-sectional view in FIG. 3, the element 10 and the flash bulb 20 are surrounded contiguously for substantially the entire length of the flash bulb by an open-ended, internally reflective sleeve 28 conveniently fabricated by a wrapping of silver foil or aluminum foil, to concentrate the pumping light emitted by the flash bulb into the element 10.

When the switch 27 is closed, the flash bulb 20 is energized to ignite its zirconium wire filling and produce a flash or pulse of light. This pulse includes light in the wavelength of at least one absorption band of the neodymium-doped glass laser fiber 14. The light from the flash bulb enters the laser element 10 directly and by reflection from the sleeve 28 and is refracted by the cladding 15 into the neodymium-doped glass fiber 14. Thereby light of the requisite absorptive wavelength is pumped into the fiber. Photons of this light are absorbed by active atoms in the fiber to cause them to shift from an initial low energy level to a very unstable high energy level; these atoms at once shift again, in a spontaneous non-emissive transition, to the relatively stable high energy level from which emissive transition occurs.

The light thus pumped into the fiber 14 is more than sufficient to establish the threshold condition for laser action. Accordingly, as individual atoms of the enlarged high-level population created by such pumping begin to undergo spontaneous emissive transition to the terminal low energy level, a portion of the light emitted incident to such transition begins to reflect back and forth through the cavity between the reflective end faces 11, 12 of the element 10 and to induce emissive transition of other atoms of the high-level population. In this manner a pulse of bidirectionally reflecting light, progressively augmented by such induced emissive transitions, develops within the element. A portion of this light is emitted from the rod through the partially transmissive end face 12, as indicated by the arrow in FIG. 1, providing at least one high-intensity laser output light pulse for each pumping light pulse.

As therefore appears, with the foregoing structure a high-intensity output light pulse useful for many laser applications is produced with the power input obtainable from one or more small flash-light cells. This highly unique and important result accrues from the use of neodymium-doped glass as a laser material, since such material can be satisfactorily pumped with a photographic flash bulb of the type described and which provides the requisite pumping light of appropriate absorption band wavelength. The character and disposition of the several elements of the structure also contribute to this desired result in that they serve to insure concentration of the light emitted by the bulb 20 on the neodymium-doped glass fiber 14 so as to maximize the pumping efficiency of the structure.

The advantages of the present structure from the standpoints of ease and economy of operation, with particular reference to the light weight, compactness, ready portability, and low cost of the energizing power source, may be appreciated by consideration of the operation of a neodymium-doped glass laser of the type described above using a conventional helical gaseous discharge tube. Merely to establish the threshold condition for laser action in a neodymium-doped glass laser of this type, using such a gaseous discharge tube as the source of pumping energy, requires a discharge of 2.0 watts-seconds. This is equivalent to a 4 mf. condenser charged to 1,050 volts. To provide sufficient power for such gaseous discharge tube requires a large and complex power source including a high-voltage source of electric current and capacitors having sufficiently large capacity to effect substantial energy storage. The brightness of the zirconium-filled flash bulb incorporated in the present invention is substantially in excess of the value requisite to establish threshold conditions; specifically, it is estimated that this brightness is of the order of twice the threshold value. In other words, with the combination of elements described above, a useful high-intensity laser output light pulse is achieved using one or more of the flashlight type of small cell or equivalent small power source to power the pumping element, as contrasted with the bulky and expensive high-voltage electric current source and capacitors necessary for power input to the gaseous discharge pumping elements heretofore used.

It is to be understood that the invention is not limited to the specific features and embodiments hereinabove set forth, but may be carried out in other ways without departure from its spirit.

I claim:

1. A laser structure comprising, in combination, means providing a resonant wave-energy propagation path, said means including an active laser element fabricated of neodymium-doped glass through which said path extends, said means further providing wave-energy reflective termination at each end of said propagation path; and a photographic flash bulb providing a source of pumping energy for said laser element and positioned to emit light into said laser element to establish a laserable inversion of energy states therein; said flash bulb including a gas-tight pressure retaining transparent envelope containing an oxidizing atmosphere and a highly combustible metal having a large surface area to volume ratio for rapid combustion characteristics at elevated temperature.

2. A laser structure comprising, in combination, means providing a resonant wave-energy propagation path, said means including an active laser element fabricated of neodymium-doped glass through which said path extends surrounded concentrically by a glass cladding, said means further providing wave-energy reflective termination at each end of said propagation path; a photographic flash bulb providing a source of pumping energy for said laser element and disposed in proximity thereto, said flash bulb including a gas-tight pressure retaining transparent envelope containing an oxidizing atmosphere and a highly combustible metal having a large surface area to volume ratio for rapid combustion characteristics at elevated temperature; and a member having a light-reflective inner surface enclosing said laser element and said flash bulb.

3. A laser structure comprising, in combination, means providing a resonant wave-energy propagation path, said means including an active laser element comprising a neodymium-doped glass fiber through which said path extends surrounded concentrically by a glass cladding, said means further providing wave-energy reflective termination at each end of said propagation path; a photographic flash bulb providing a source of pumping energy for said laser element and disposed in proximity thereto, said flash bulb including a gas-tight pressure retaining transparent envelope containing an oxidizing atmosphere and a highly combustible metal wool; and a member having a light-reflective inner surface enclosing said laser element and said flash bulb.

4. A laser structure comprising, in combination, means providing a resonant wave-energy propagation path, said means including an active laser element comprising a neodymium-doped glass fiber through which said path extends surrounded concentrically by a glass cladding, said means further providing wave-energy reflective termination at each end of said propagation path; a photographic flash bulb providing a source of pumping energy for said laser element and disposed in proximity thereto, said flash bulb including a gas-tight pressure retaining transparent envelope containing an oxidizing atmosphere and zirconium wool; and a member having a light-reflective inner surface enclosing said laser element and said flash bulb.

5. A laser structure comprising, in combination, means providing a resonant wave-energy propagation path, said means including an active laser element comprising a neodymium-doped glass fiber through which said path extends surrounded concentrically by a glass cladding, said means further providing wave-energy reflective termination at each end of said propagation path; a photographic flash bulb providing a source of pumping energy for said laser element and disposed in proximity thereto, said flash bulb including a gas-tight pressure retaining transparent envelope containing an oxidizing atmosphere and a highly combustible metal wool, and having external electrical connections for ignition of said metal wool; a member having a light-reflective inner surface enclosing said laser element and said flash bulb; and means including a source of electric current connected to said external connections of said flash bulb for electrically igniting said metal wool.

6. A laser structure comprising, in combination, means providing a resonant wave-energy propagation path, said means including an elongated rod-shaped active laser element comprising a neodymium-doped glass fiber through which said path extends surrounded concentrically by a glass cladding, said means further providing wave-energy reflective termination at each end of said propagation path; a photographic flash bulb providing a source of pumping energy for said laser element and disposed in axially parallel contiguous relation to said cladding, said flash bulb including a gas-tight glass envelope containing an oxygen atmosphere and zirconium wool and having external electrical connections for ignition of said zirconium wool; an open-ended member having a light-reflective inner surface closely laterally surrounding said laser element and said flash bulb; and a dry cell connected to said external connections of said flash bulb for electrically igniting said zirconium wool.

References Cited in the file of this patent

UNITED STATES PATENTS 2,798,368     Anderson _____ July 9, 1957

OTHER REFERENCES

Miles et al.: "Optically Efficient Ruby Laser Pump," Journal of Applied Physics, vol. 32, No. 4, April 1961, pages 740 and 741.

Snitzer: "Optical Maser Action of $Nd^{+3}$ in a Barium Crown Glass," Physical Review Letters, Dec. 15, 1961, vol. 7, No. 12, pages 444 to 446.

Bushor: "Sun and Exploding Wires Pump Lasers," Electronics, vol. 35, No. 13, March 30, 1962, pages 24 and 25.